United States Patent
Nishida

(10) Patent No.: US 9,197,083 B2
(45) Date of Patent: Nov. 24, 2015

(54) ELECTRONIC APPARATUS, CONTROL METHOD, AND RECORDING MEDIUM

(75) Inventor: Tokuro Nishida, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 276 days.

(21) Appl. No.: 13/325,949

(22) Filed: Dec. 14, 2011

(65) Prior Publication Data

US 2012/0161718 A1    Jun. 28, 2012

(30) Foreign Application Priority Data

Dec. 22, 2010  (JP) ................................. 2010-286527

(51) Int. Cl.
*H02J 7/04* (2006.01)
*H02J 7/00* (2006.01)
*H01M 10/48* (2006.01)

(52) U.S. Cl.
CPC ............. *H02J 7/0031* (2013.01); *H01M 10/48* (2013.01)

(58) Field of Classification Search
USPC ............... 320/150, 154, 160, 104; 429/61, 62
See application file for complete search history.

(56) References Cited

U.S. PATENT DOCUMENTS

| | | | |
|---|---|---|---|
| 5,939,865 A * | 8/1999 | McGrath et al. | 320/156 |
| 6,064,179 A * | 5/2000 | Ito et al. | 320/128 |
| 6,271,643 B1 * | 8/2001 | Becker et al. | 320/112 |
| 7,333,314 B2 | 2/2008 | Yamaji et al. | |
| 2003/0167415 A1 | 9/2003 | Odaohhara et al. | |
| 2004/0104709 A1 | 6/2004 | Yamaji et al. | |
| 2007/0145954 A1 * | 6/2007 | Kawahara et al. | 320/150 |
| 2008/0122400 A1 * | 5/2008 | Kubota et al. | 320/106 |
| 2009/0164153 A1 | 6/2009 | Watanabe | |
| 2010/0188052 A1 * | 7/2010 | Su et al. | 320/148 |
| 2010/0194349 A1 | 8/2010 | Hibi et al. | |
| 2010/0199079 A1 | 8/2010 | Hibi et al. | |

FOREIGN PATENT DOCUMENTS

| | | |
|---|---|---|
| CN | 1498439 A | 5/2004 |
| CN | 101795199 A | 8/2010 |
| JP | 2004-334476 A | 11/2004 |
| JP | 2008-029087 A | 2/2008 |
| JP | 2010-178183 A | 8/2010 |

* cited by examiner

*Primary Examiner* — Yalkew Fantu
(74) *Attorney, Agent, or Firm* — Canon U.S.A., Inc. IP Division

(57) ABSTRACT

There is provided an electronic apparatus that can properly control a power state of an electronic apparatus by using a temperature of a battery pack. The electronic apparatus detects a temperature of a battery pack and a remaining capacity of the battery pack. If the temperature of the battery pack is less than or equal to a predetermined temperature, the electronic apparatus performs process for turning a power state of the electronic apparatus from ON to OFF based on the remaining capacity of the battery pack.

12 Claims, 4 Drawing Sheets

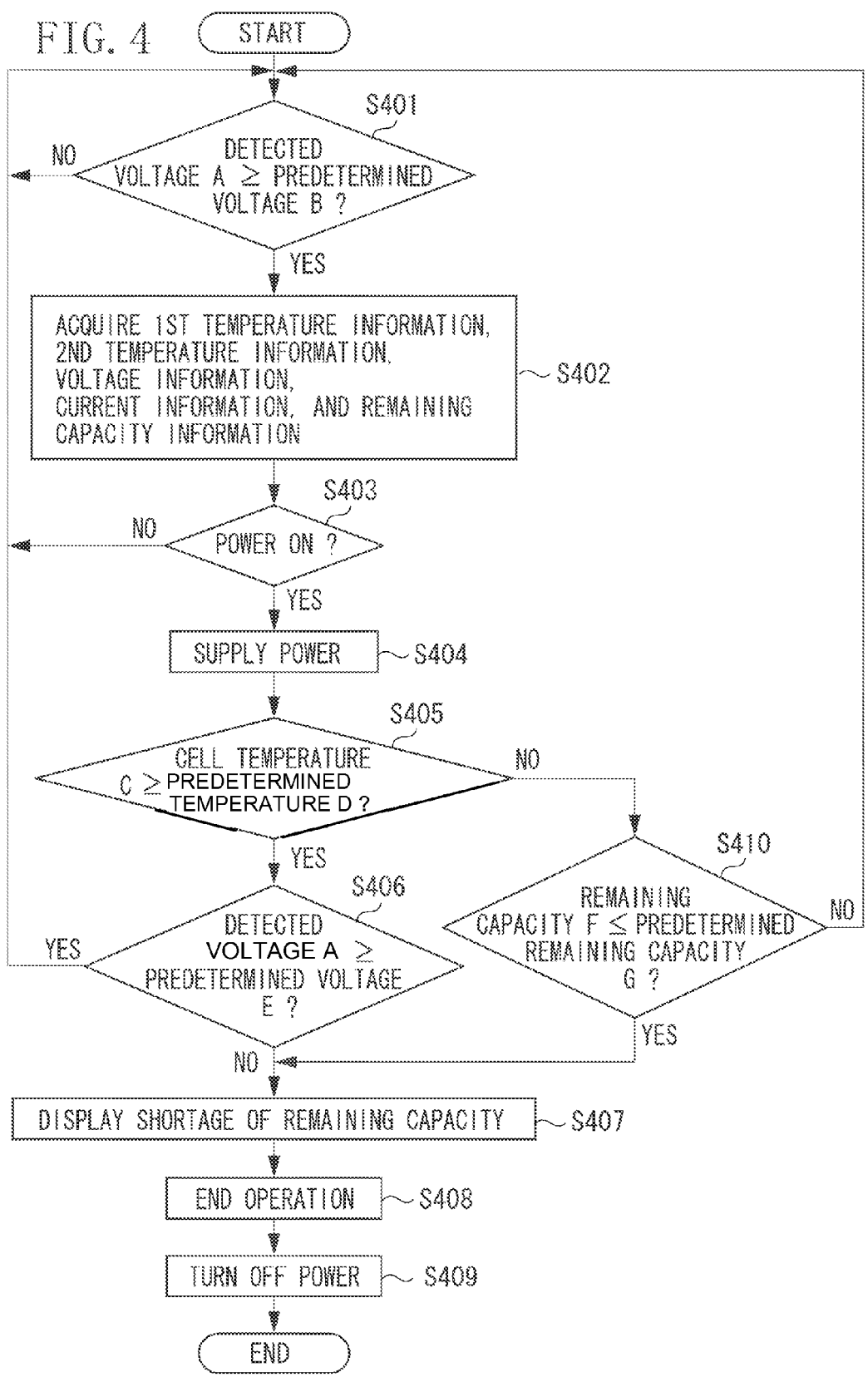

ELECTRONIC APPARATUS, CONTROL METHOD, AND RECORDING MEDIUM

BACKGROUND OF THE INVENTION

1. Field of the Invention

The present invention relates to an electronic apparatus to which power is supplied from a battery, a control method, and a recording medium.

2. Description of the Related Art

Recently, reduction in size and weight has been required for an electronic apparatus such as a portable mobile phone or a digital still camera. As a power supply of the electronic apparatus, a battery pack is used, including a lithium-ion battery as a small and light battery with high energy density.

Japanese Patent Application Laid-Open No. 2010-178183 discusses an electronic apparatus that uses a secondary battery, such as a lithium-ion battery. The electronic apparatus detects a battery voltage supplied from the secondary battery thereto and to stop power supplied from the secondary battery thereto when the battery voltage is less than a predetermined value.

The lithium-ion battery has characteristics that internal resistance of the lithium-ion battery is varied depending on a temperature change thereof. At a low temperature of the lithium-ion battery, the internal resistance of the lithium-ion battery increases.

When supplying power to the electronic apparatus from the battery pack including the lithium-ion battery, at the low temperature of the lithium-ion battery, the internal resistance of the lithium-ion battery increases. Thus, the battery voltage supplied to the electronic apparatus from the battery pack sharply decreases.

When the battery voltage supplied to the electronic apparatus from the battery pack is sharply decreased, the electronic apparatus has a problem that the power supply of the electronic apparatus is not controlled before normally stopping operations of units in the electronic apparatus.

In this case, an error occurs in process of the electronic apparatus before stopping the power supplied to the electronic apparatus from the battery pack or in process for solving the error. It takes a long time to initialize the electronic apparatus.

SUMMARY OF THE INVENTION

The present invention is directed to an electronic apparatus capable of properly controlling power supply of an electronic apparatus according to a temperature of a battery pack, and a control method.

According to an aspect of the present invention, an electronic apparatus includes a detection unit that detects a temperature of a battery pack and a remaining capacity of the battery pack, and a control unit that performs predetermined process for turning a power state of the electronic apparatus from ON to OFF based on the remaining capacity of the battery pack if the temperature of the battery pack is equal to or less than a predetermined temperature.

According to another aspect of the present invention, a control method for controlling an electronic apparatus, includes detecting a temperature of a battery pack, detecting a remaining capacity of the battery pack, and performing predetermined process for turning a power state of the electronic apparatus from ON to OFF based on the remaining capacity of the battery pack if the temperature of the battery pack is equal to or less than a predetermined temperature.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a flowchart illustrating an example of power control process according to the first exemplary embodiment.

DESCRIPTION OF THE EMBODIMENTS

Various exemplary embodiments, features, and aspects of the invention will be described in detail below with reference to the drawings.

An exemplary embodiment of the present invention is described below. Note that the exemplary embodiment is just an example and the present invention is not limited to this.

A first exemplary embodiment of the present invention is described below with reference to FIGS. 1 and 2. The power control system according to the first exemplary embodiment includes an electronic apparatus 100 and a battery pack 200. The electronic apparatus 100 is operated with power supplied from the battery pack 200 attached to the electronic apparatus 100.

Figure 1:
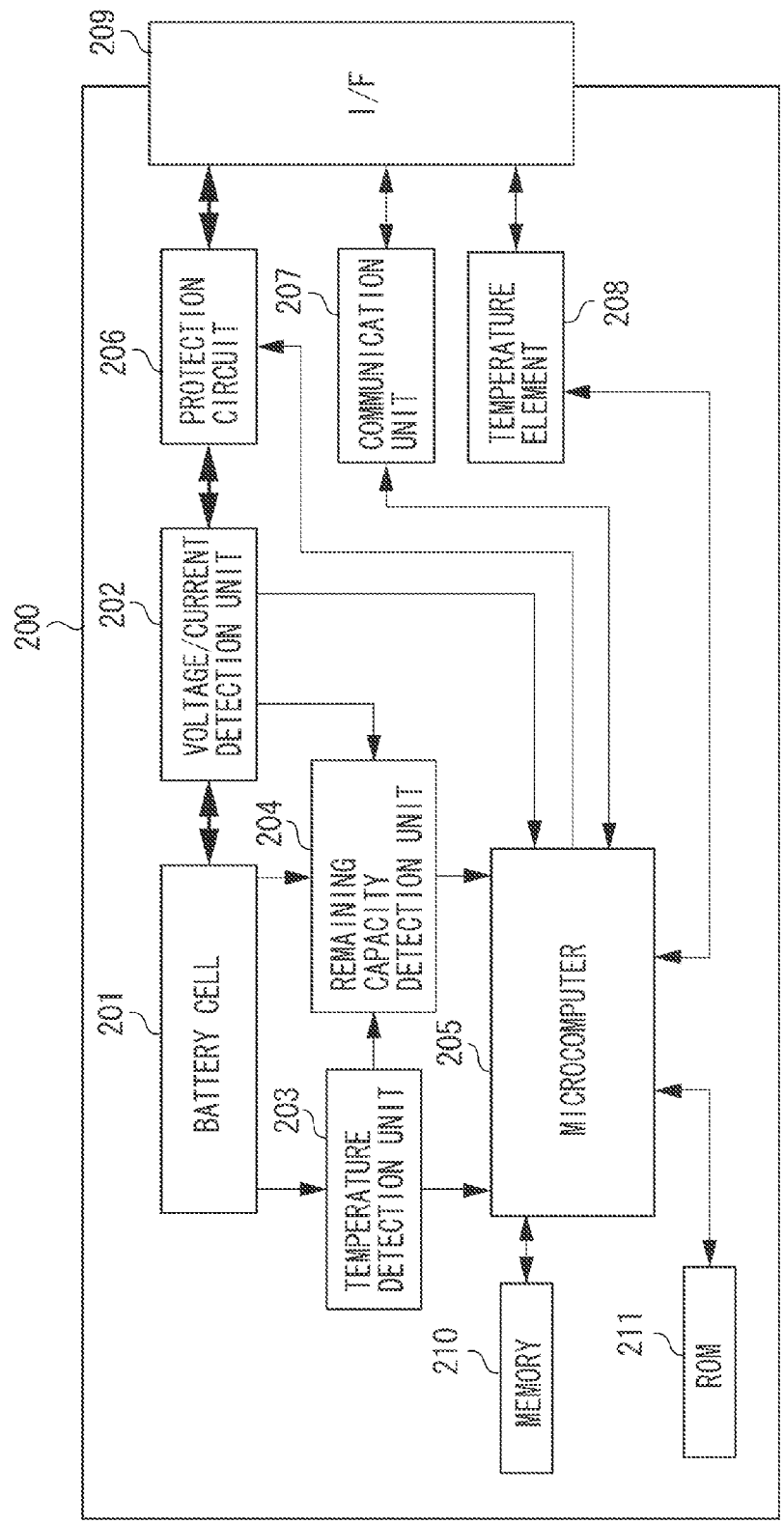
FIG. 1 is a block diagram illustrating an example of a battery pack according to a first exemplary embodiment of the present invention.
Figure 2:
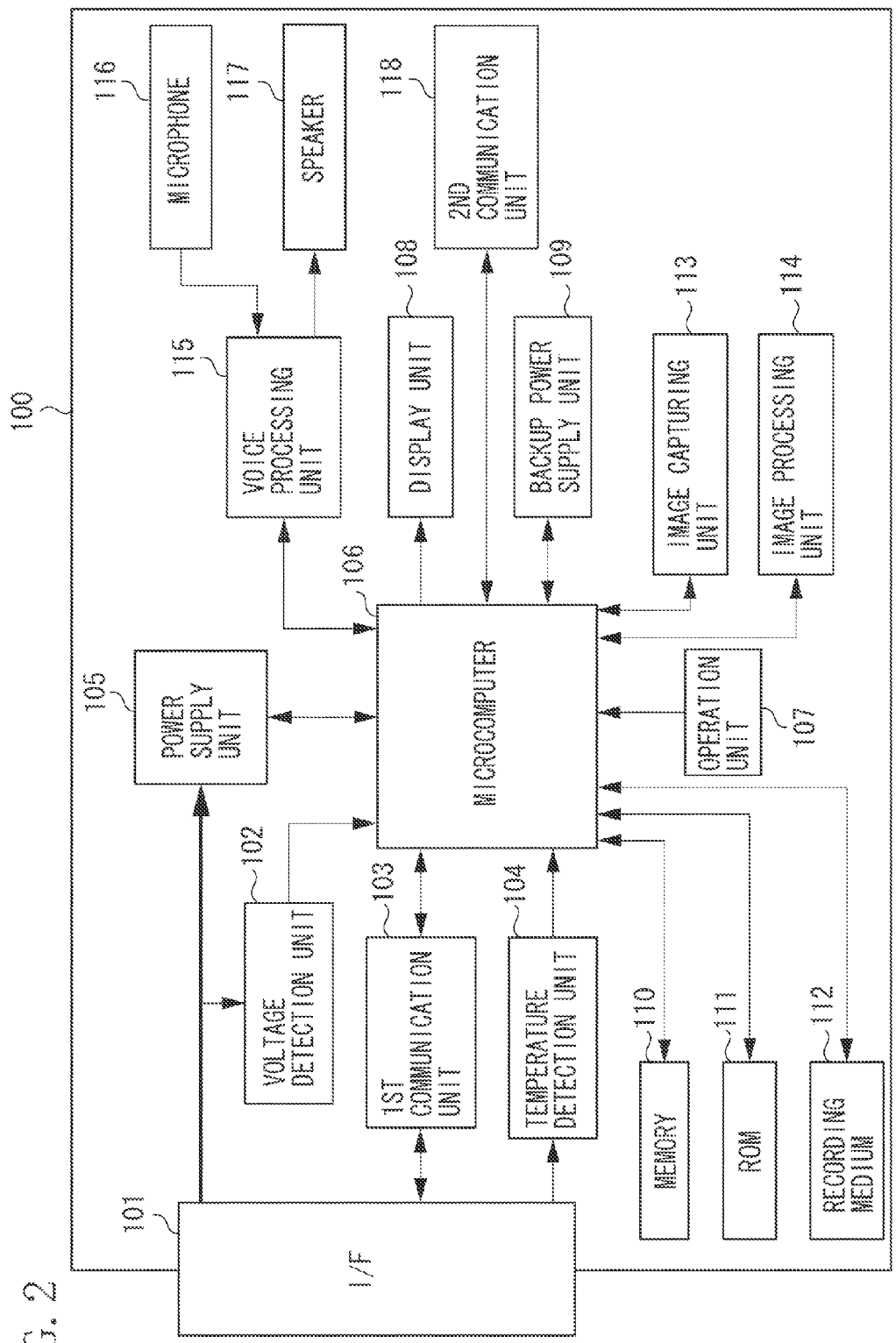
FIG. 2 is a block diagram illustrating an example of an electronic apparatus according to the first exemplary embodiment.

FIG. 1 is a block diagram illustrating an example of the battery pack 200 in the power control system. FIG. 2 is a block diagram illustrating an example of the electronic apparatus 100 in the power control system. Hereinbelow, a specific description is given of the electronic apparatus 100 and the battery pack 200.

The battery pack 200 includes a battery cell 201, a voltage/current detection unit 202, a temperature detection unit 203, a remaining capacity detection unit 204, a microcomputer 205, a protection circuit 206, a communication unit 207, a temperature element 208, an interface 209, a memory 210, and a read only memory (ROM) 211.

The battery pack 200 is attached to the electronic apparatus 100 by connecting the interface 209 in the battery pack 200 to an interface 101 in the electronic apparatus 100.

When the battery pack 200 is attached to the electronic apparatus 100, the microcomputer 205 receives or transmits information from/to a microcomputer 106 in the electronic apparatus 100 via the interface 209 in the battery pack 200 and the interface 101 in the electronic apparatus 100.

The battery cell 201 is a rechargeable secondary battery cell. The number of battery cells contained in the battery pack 200 is not limited to one. Two or more battery cells may be serially connected.

The battery cell 201 may be a non-aqueous solvent-system secondary battery such as a lithium-ion battery or a secondary battery cell such as a nickel-cadmium (Ni—Cd) battery, a nickel-metal hydride(Ni—H) battery, or a lithium battery.

The voltage/current detection unit 202 detects a voltage of the battery cell 201 and current flowing to the battery cell 201. When the battery pack 200 is attached to the electronic apparatus 100, the voltage/current detection unit 202 detects a voltage (discharge voltage) discharged to the electronic apparatus 100 from the battery cell 201. Further, the voltage/current detection unit 202 detects current (discharge current) discharged to the electronic apparatus 100 from the battery cell 201.

When the battery pack 200 is attached to a battery charger, the voltage/current detection unit 202 detects a voltage (charge voltage) supplied to the battery cell 201 from the battery charger. Further, the voltage/current detection unit 202 detects current (charge current) supplied to the battery cell 201 from the battery charger. When the number of battery cells is 2 or more, the voltage/current detection unit 202 detects each of the voltages of the battery cells, and each of the currents flowing to the battery cells.

The voltage/current detection unit 202 transmits voltage information indicating a detected voltage of the battery cell 201 to the remaining capacity detection unit 204 and the microcomputer 205. Further, the voltage/current detection unit 202 transmits current information indicating a detected current flowing to the battery cell 201 to the remaining capacity detection unit 204 and the microcomputer 205.

The temperature detection unit 203 detects a temperature of the battery cell 201. Further, the temperature detection unit 203 transmits first temperature information indicating a detected temperature of the battery cell 201 to the remaining capacity detection unit 204 and the microcomputer 205. When the number of battery cells contained in the battery pack 200 is two or more, the temperature detection unit 203 detects the temperature of each battery cell.

The remaining capacity detection unit 204 detects a remaining capacity of the battery cell 201 based on the voltage information and the current information transmitted from the voltage/current detection unit 202 and the first temperature information transmitted from the temperature detection unit 203.

The remaining capacity of the battery cell 201 indicates a remaining power capacity charged in the battery cell 201. Further, the remaining capacity detection unit 204 transmits remaining capacity information indicating the detected remaining capacity of the battery cell 201 to the microcomputer 205.

The microcomputer 205 controls the battery pack 200.

Further, the microcomputer 205 stores the voltage information and the current information transmitted from the voltage/current detection unit 202 in the memory 210. Furthermore, the microcomputer 205 stores the first temperature information transmitted from the temperature detection unit 203 in the memory 210. In addition, the microcomputer 205 stores the remaining capacity information transmitted from the remaining capacity detection unit 204 in the memory 210.

In addition, the microcomputer 205 controls the protection circuit 206 based on the voltage information, the current information, the first temperature information, and the remaining capacity information.

The protection circuit 206 includes a field effect transistor (FET). One terminal of the protection circuit 206 is connected to the battery cell 201. The other terminal thereof is connected to the interface 209 in the battery pack 200.

When the battery pack 200 is attached to the electronic apparatus 100, the protection circuit 206 connects the battery cell 201 to the interface 209, thereby connecting the battery cell 201 to the electronic apparatus 100. Further, the protection circuit 206 disconnects the battery cell 201 from the interface 209, thereby disconnecting the battery cell 201 from the electronic apparatus 100.

When the battery pack 200 is attached to the electronic apparatus 100, a voltage of the battery cell 201 is reduced with discharge to the electronic apparatus 100. Therefore, the microcomputer 205 performs control of whether power is supplied to the electronic apparatus 100, according to whether the voltage of the battery cell 201 is equal to or higher than a predetermined voltage V.

When the battery pack 200 is attached to the electronic apparatus 100, if the microcomputer 205 determines that the voltage of the battery cell 201 is lower than the predetermined voltage V, then, the microcomputer 205 controls the protection circuit 206 to turn OFF (non-conductive). In this case, the protection circuit 206 is operated to disconnect the battery cell 201 from the interface 209.

When the battery pack 200 is attached to the electronic apparatus 100, if the microcomputer 205 determines that the voltage of the battery cell 201 is equal to or higher than the predetermined voltage V, then, the microcomputer 205 controls the protection circuit 206 to turn ON (conductive). In this case, the protection circuit 206 is operated to connect the battery cell 201 to the interface 209.

The predetermined voltage V is set according to an end voltage of the discharge, and is stored in advance on the ROM 211. As a result, it is possible to prevent the over-discharge to the electronic apparatus 100 with the battery cell 201. The end voltage of the discharge is a threshold to prevent the discharge to the electronic apparatus 100 with the battery pack 200. The predetermined voltage V may be a voltage—equal to or greater than the end voltage of the discharge.

Before determining that the voltage of the battery cell 201 is lower than the predetermined voltage V, the microcomputer 205 sets a value of the predetermined voltage V so that the remaining capacity of the battery cell 201 detected by the remaining capacity detection unit 204 becomes 0. That is, before controlling the protection circuit 206 to turn OFF with reduction in voltage of the battery cell 201, the microcomputer 205 makes the remaining capacity of the battery pack 200 to be 0.

When the battery pack 200 is attached to the electronic apparatus 100, if the microcomputer 205 determines that the current flowing to the battery cell 201 is abnormal, the microcomputer 205 controls the protection circuit 206 to turn OFF. In this case, the protection circuit 206 is operated to disconnect the battery cell 201 from the interface 209.

When the battery pack 200 is attached to the electronic apparatus 100, if the microcomputer 205 determines that the temperature of the battery cell 201 is abnormal, then, the microcomputer 205 controls the protection circuit 206 to turn OFF. In this case, the protection circuit 206 is operated to disconnect the battery cell 201 from the interface 209.

When the battery pack 200 is attached to the electronic apparatus 100, the communication unit 207 can receive a communication command from the electronic apparatus 100. Further, when the battery pack 200 is attached to the electronic apparatus 100, the communication unit 207 can transmit the communication command to the electronic apparatus 100 from the battery pack 200.

In this case, the microcomputer 205 controls the entire battery pack 200 according to the communication command received from the electronic apparatus 100.

The communication command is information used for communication between the battery pack 200 and the electronic apparatus 100.

The communication unit 207 can transmit, to the electronic apparatus 100, the voltage information, the current information, the first temperature information, and the remaining capacity information stored in the memory 210, and identifier (ID) information of the battery pack 200.

Further, the communication unit 207 can receive information detected by the electronic apparatus 100, information for identifying the electronic apparatus 100, and information indicating a function of the electronic apparatus 100.

The temperature element 208 detects the temperature of the battery pack 200. Further, the temperature element 208 transmits second temperature information indicating a detected temperature of the battery pack 200 to the microcomputer 205. When acquiring the second temperature information from the temperature element 208, the microcomputer 205 stores the acquired information in the memory 210.

When the battery pack 200 is attached to the electronic apparatus 100, the temperature element 208 transmits the second temperature information indicating the detected temperature of the battery pack 200 to the electronic apparatus 100 via the interface 209. As the temperature element 208, for example, a thermistor is used.

The temperature detection unit 203 detects the temperature near the battery cell 201 including the battery cell 201, and further individually detects the temperature of the battery cell. However, the temperature element 208 detects the temperature of the entire battery pack 200. The remaining capacity detection unit 204 may detect the remaining capacity of the battery cell 201 by using the second temperature information detected by the temperature element 208. The microcomputer 205 may control the protection circuit 206 according to the second temperature information.

The interface 209 is a connection terminal for connection to the interface 101 in the electronic apparatus 100. As the connection terminal, a conductive metallic electrode is used for electrical connection to the interface 101 in the electronic apparatus 100.

The memory 210 stores the voltage information, the current information, the first temperature information, the second temperature information, and the remaining capacity information. The memory 210 may be a volatile memory or a nonvolatile memory. Alternatively, the memory 210 may be a memory card or a flash memory.

A read only memory (ROM) 211 stores a computer program for controlling the battery pack 200 and information such as a parameter of the battery pack 200. Further, the ROM 211 stores an identifier (ID) as identification information of the battery pack 200.

The microcomputer 205 controls the battery pack 200 according to the computer program stored in the ROM 211 and the parameter of the battery pack 200.

The ROM 211 may be a memory card or a flash memory other than the ROM as long as it can store the computer program for controlling the battery pack 200 and the information such as the parameter of the battery pack 200.

The electronic apparatus 100 is described below using a mobile phone 100 as an example.

The mobile phone 100 according to the first exemplary embodiment has operation modes such as a voice communication mode, an e-mail mode, an Internet access mode, a video capturing mode, and a video reproduction mode.

The mobile phone 100 includes the interface 101, a voltage detection unit 102, a first communication unit 103, a temperature detection unit 104, a power supply unit 105, a microcomputer 106, an operation unit 107, a display unit 108, and a backup power supply unit 109. Further, the mobile phone 100 includes the memory 110, a read only memory (ROM) 111, a recording medium 112, an image capturing unit 113, an image processing unit 114, a voice processing unit 115, a microphone 116, a speaker 117, and a second communication unit 118.

The interface 101 is a connection terminal for connection to the interface 209 in the battery pack 200. As the connection terminal, a conductive metallic electrode is used for electrical connection to the interface 209 in the battery pack 200.

The voltage detection unit 102 detects a voltage supplied via the interface 101. When the battery pack 200 is attached to the electronic apparatus 100, the voltage detection unit 102 detects a voltage supplied to the electronic apparatus 100 from the battery pack 200 via the interface 101.

The voltage detection unit 102 transmits voltage information indicating the voltage supplied from the battery pack 200 detected via the interface 101 to the microcomputer 106.

When the battery pack 200 is attached to the electronic apparatus 100, the first communication unit 103 can receive a communication command from the battery pack 200 via the interface 101. In this case, the microcomputer 106 controls the electronic apparatus 100 in response to the communication command received from the battery pack 200.

When the battery pack 200 is attached to the electronic apparatus 100, the first communication unit 103 can transmit the communication command to the battery pack 200 via the interface 101.

The communication command is information used for communication between the battery pack 200 and the electronic apparatus 100.

The first communication unit 103 can receive the voltage information, the current information, the first temperature information, the remaining capacity information, and ID information of the battery pack 200, from the battery pack 200 via the interface 101. Further, the first communication unit 103 transmits the information received from the battery pack 200 to the memory 110.

Furthermore, the first communication unit 103 can transmit, to the battery pack 200 via the interface 101, information detected by the mobile phone 100, identifier (ID) information of the mobile phone 100, and information indicating a function of the mobile phone 100.

When the battery pack 200 is attached to the mobile phone 100, the temperature detection unit 104 acquires the second temperature information from the temperature element 208 via the interface 101, and detects the temperature of the battery pack 200. However, when the battery pack 200 is not attached to the mobile phone 100, the temperature detection unit 104 cannot acquire the second temperature information from the temperature element 208 via the interface 101. Therefore, the temperature detection unit 104 cannot detect the temperature of the battery pack 200.

The power supply unit 105 converts the voltage supplied via the interface 101 into a voltage to be supplied to the mobile phone 100. The power supply unit 105 supplies the converted voltage to the microcomputer 106, and further supplies the voltage converted in response to an instruction of the microcomputer 106 to the mobile phone 100.

When the battery pack 200 is attached to the electronic apparatus 100, the power supply unit 105 acquires a voltage supplied from the battery pack 200 via the interface 101.

The microcomputer 106 controls the mobile phone 100. Further, the microcomputer 106 stores the voltage information transmitted from the voltage detection unit 102 in the memory 110. Furthermore, the microcomputer 106 stores the second temperature information transmitted from the temperature detection unit 104 in the memory 110. In addition, the microcomputer 106 controls the first communication unit 103 to store the information received from the battery pack 200 in the memory 110.

The operation unit 107 includes a power button, a number key, and operation keys for inputting data by a user.

The display unit 108 includes a liquid crystal display panel, and displays various screens in response to an instruction from the microcomputer 106.

When the battery pack 200 is not attached to the mobile phone 100, the backup power supply unit 109 supplies power for operating the microcomputer 106 thereto. Further, when the battery pack 200 is not attached to the mobile phone 100, the backup power supply unit 109 supplies power for holding information stored in the memory 110 thereto.

The memory 110 stores the information received via the interface 101 by the first communication unit 103. The information received via the interface 101 by the first communication unit 103 includes, for example, the ID information of the battery pack 200, the voltage information, the current information, the remaining capacity information, the first temperature information, and the second temperature information. Further, the information received via the interface 101 by the first communication unit 103 may include error notification information indicating that an error occurs in the battery pack 200.

Moreover, the memory 110 stores the information received by the second communication unit 118. The information received by the second communication unit 118 includes information of an address book or e-mail data.

In addition, the memory 110 stores video data captured by the image capturing unit 113, voice data acquired by the microphone 116, or video data subjected to image process by the image processing unit 114. The memory 110 may be a volatile memory or a nonvolatile memory. Alternatively, the memory 110 may be a memory card or a flash memory.

The ROM 111 stores information such as a computer program for controlling the mobile phone 100 and a parameter of the mobile phone 100. Further, the ROM 111 stores an identifier (ID) as identification information of the mobile phone 100. The microcomputer 106 controls the mobile phone 100 according to the computer program stored in the ROM 111 and the parameter of the mobile phone 100.

Figure 3:
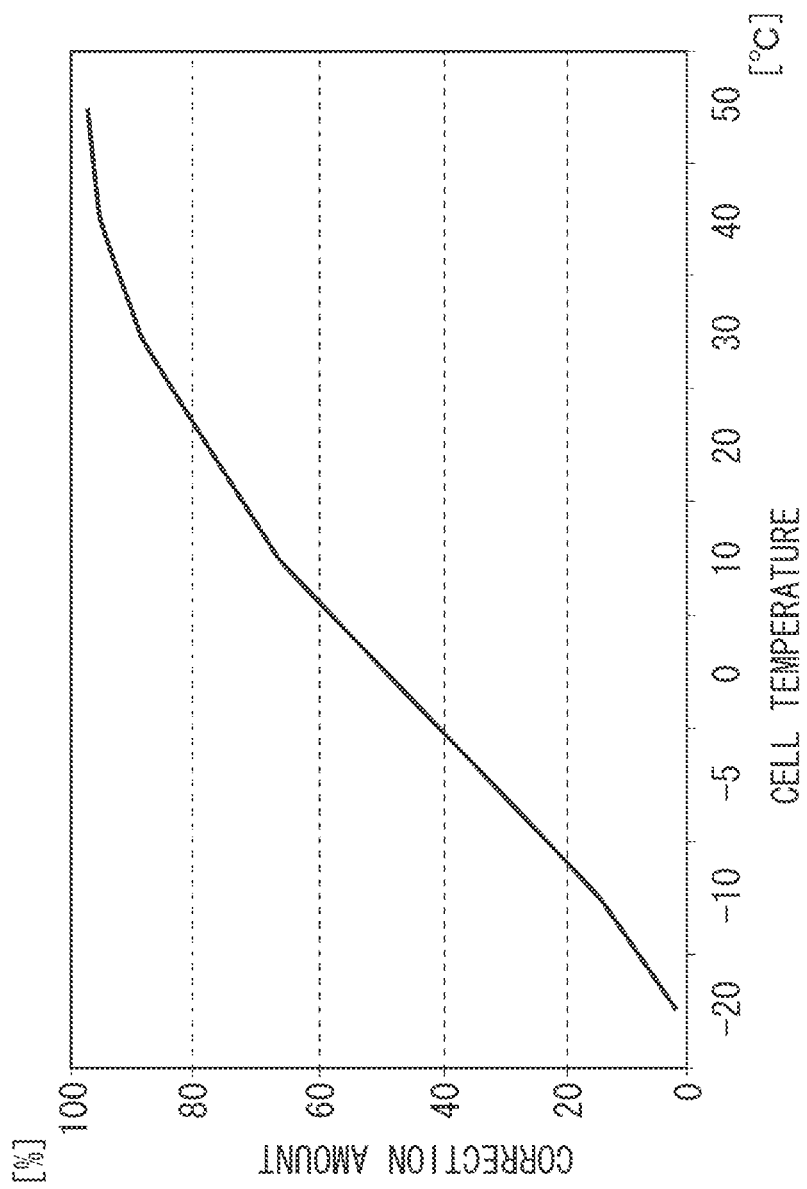
FIG. 3 is a graph illustrating a correction amount to a remaining capacity of a battery according to the first exemplary embodiment.

Further, data corresponding to the correction amount indicating a relation between the temperatures of the battery pack 200 illustrated in FIG. 3 and a correction amount to the remaining capacity of the battery pack 200 acquired from the remaining capacity information are stored in the ROM 111. When acquiring any of the first temperature information and the second temperature information from the battery pack 200, the microcomputer 106 detects the temperature of the battery cell 201 in the battery pack 200 from one of the first temperature information and the second temperature information.

When acquiring the remaining capacity information, the microcomputer 106 detects the remaining capacity of the battery pack 200 from the remaining capacity information. So long as it can store information such as the computer program for controlling the electronic apparatus 100 and the parameter of the electronic apparatus 100, the ROM 111 may be a memory card or a flash memory other than the ROM.

Further, the microcomputer 106 detects the correction amount to the remaining capacity of the battery pack 200 based on the temperature of the battery cell 201 and the data corresponding to the correction amount recorded to the ROM 111. Thereby, the microcomputer 106 corrects the remaining capacity of the battery pack 200.

In this case, the microcomputer 106 stores the corrected remaining capacity of the battery pack 200 in the memory 110. The microcomputer 106 may individually store the remaining capacity of the battery pack 200 acquired from the remaining capacity information and the corrected remaining capacity of the battery pack 200 in the memory 110. Further, the microcomputer 106 may overwrite, on the memory 110, the corrected remaining capacity of the battery pack 200 acquired from the remaining capacity information.

The recording medium 112 stores video data such as a still image or a motion image captured by the image capturing unit 113. Further, the recording medium 112 stores video data subjected to image process by the image processing unit 114. The microcomputer 106 can control the video data captured by the image capturing unit 113 or the video data subjected to the image process by the image processing unit 114 to be stored in the recording medium 112.

Further, the microcomputer 106 can control the video data or voice data stored in the recording medium 112 to be read from the recording medium 112. The video data read from the recording medium 112 is transmitted to the image processing unit 114, the second communication unit 118, and the display unit 108. Moreover, the voice data read from the recording medium 112 is transmitted to the voice processing unit 115, the second communication unit 118, and the speaker 117.

The recording medium 112 may be a memory card, a flash memory, or a hard disk using a magnetic disk.

Alternatively, the recording medium 112 may be a recording medium detachable from the mobile phone 100 or a recording medium in the mobile phone 100.

The image capturing unit 113 captures a still image or a motion image of a subject, and transmits the captured image to the image processing unit 114.

When the image capturing unit 113 captures the video image, the image processing unit 114 performs predetermined process on the video image transmitted from the image capturing unit 113. Further, the image processing unit 114 generates video data from the video image transmitted from the image capturing unit 113. In the predetermined process, the video image transmitted from the image capturing unit 113 is converted into a recording format. The video data generated by the image processing unit 114 is transmitted on the recording medium 112, and is stored in the recording medium 112.

Further, in reproduction of the video data stored in the recording medium 112, the image processing unit 114 performs process for converting the video data stored in the recording medium 112 into a display format. As a result, the image processing unit 114 generates display data for displaying on the display unit 108 from the video data stored in the recording medium 112. The display data generated by the image processing unit 114 is transmitted to the display unit 108, and is displayed on the display unit 108.

In voice communication using the mobile phone 100, the voice processing unit 115 converts the voice data from the microphone 116 into a communication format, and transmits the voice data to the second communication unit 118. Further, the voice processing unit 115 decodes the voice data sent from a communication partner via the second communication unit 118, and transmits the decoded voice data to the speaker 117.

The second communication unit 118 communicates the voice data or video data with another phone using a communication system of a communication carrier subscribed by a user. Further, the second communication unit 118 communicates data based on a well-known communication system such as a wiring communication system using a universal serial bus (USB) or wireless communication.

Next, a voice communication function of the mobile phone 100 is described. When making a call to the communication partner, a user operates a number key of the operation unit 107 to input a number of the communication partner. Alternatively, the address book stored in the memory 110 is displayed on the display unit 108, the communication partner is selected, and a call is instructed.

When instructing the call, the microcomputer 106 sends the call to the communication partner via the second communication unit 118. When the call arrives at the communication partner, the second communication unit 118 outputs voice data of the partner to the voice processing unit 115, and transmits voice data of the user to the partner.

Further, when sending an e-mail, the user instructs e-mail writing with the operation unit 107. When instructing the e-mail writing, the microcomputer 106 displays a screen for e-mail writing on the display unit 108. The user inputs a sending address or an e-mail body with the operation unit 107, and instructs e-mail sending.

When instructing the e-mail sending, the microcomputer 106 transmits information on an address and data on the e-mail body to the second communication unit 118. The second communication unit 118 converts the data on the e-mail into a communication format, and transmits the converted data to the sending destination. Further, when receiving the e-mail, the second communication unit 118 converts the received data of the e-mail into a display format, and displays the converted data on the display unit 108.

Next, an image capturing function of the mobile phone 100 is described. The user operates the operation unit 107 to set the image capturing mode. Thereafter, the user performs instruction to capture a still image or a motion image. Then, the image capturing unit 113 captures still image data or motion image data, and transmits the captured image data to the image processing unit 114. The image processing unit 114 processes the captured still image data or motion image data, and stores the processed data in the memory 110. Further, the image processing unit 114 transmits the captured still image data or motion image data to the recording medium 112.

Further, the mobile phone 100 transmits a file containing the captured still image or motion image data, as an attachment file of the e-mail. Specifically, when sending an e-mail, a video file stored in the ROM 111 or the recording medium 112 is selected. Transmission of the selected video file is instructed to send as an attachment file.

Furthermore, the mobile phone 100 can transmit the file containing the captured still image or motion image data to an external device such as a personal computer (PC) or another phone via an interface (not illustrated). The user operates the operation unit 107, selects the video file stored in the ROM 111 or the recording medium 112, and instructs the transmission. The microcomputer 106 controls the selected video file from the ROM 111 or the recording medium 112 to be read and transmitted to the external device.

Power control process performed by the mobile phone 100 according to the first exemplary embodiment is described with reference to a flowchart in FIG. 4. The microcomputer 106 executes the computer program stored in the ROM 111, thereby realizing the power control process.

The mobile phone 100 performs the power control process in FIG. 4 when the battery pack 200 is attached to the mobile phone 100. When the electronic apparatus 100 is turned off, the backup power supply unit 109 supplies power at least to the voltage detection unit 102, the temperature detection unit 104, the microcomputer 106, the operation unit 107, the memory 110, and the ROM 111.

The voltage detection unit 102 detects a voltage supplied from the battery pack 200 via the interface 101. A voltage detected by the voltage detection unit 102 is referred to as a "detected voltage A". At this time, the battery pack 200 supplies a voltage equal to the detected voltage A detected by the voltage detection unit 102 to the power supply unit 105 via the interface 101.

In step S401, the microcomputer 106 determines whether the detected voltage A by the voltage detection unit 102 is equal to or higher than a predetermined voltage B. The predetermined voltage B is stored in advance to the ROM 111.

If the microcomputer 106 determines that the detected voltage A is lower than the predetermined voltage B (NO in step S401), the flowchart returns to step S401. That is, if the microcomputer 106 determines that the detected voltage A is lower than the predetermined voltage B, the microcomputer 106 determines that the battery pack 200 is not connected to the mobile phone 100 via the interface 101. Further, in this case, the microcomputer 106 also determines that the battery pack 200 does not have a sufficient remaining capacity for supplying power to the mobile phone 100.

If the microcomputer 106 determines that the detected voltage A is equal to or higher than the predetermined voltage B (YES in step S401), the flowchart proceeds from step S401 to step S402. Also if the microcomputer 106 determines that the detected voltage A is equal to or higher than the predetermined voltage B, the microcomputer 106 determines that the battery pack 200 having the remaining capacity enough for supplying power to the mobile phone 100 is attached to the mobile phone 100.

In this case, a voltage that is equal to or higher than the predetermined voltage B is supplied to the power supply unit 105. In this case, the microcomputer 106 controls the power supply unit 105 to supply the power from the battery pack 200 to the voltage detection unit 102, the first communication unit 103, the temperature detection unit 104, the microcomputer 106, the operation unit 107, the memory 110, and the ROM 111.

Further, the microcomputer 106 controls the backup power supply unit 109 to stop the operation of the backup power supply unit 109. In this case, the backup power supply unit 109 does not supply power to the voltage detection unit 102, the first communication unit 103, the temperature detection unit 104, the microcomputer 106, the operation unit 107, the memory 110, and the ROM 111. However, the power supply unit 105 supplies power from the battery pack 200 to these units.

If the microcomputer 106 determines that the detected voltage A is equal to or higher than the predetermined voltage B (YES in step S401), the operation unit 107 receives an operation from the user. On the other hand, if the microcomputer 106 determines that the detected voltage A is lower than the predetermined voltage B (NO in step S401), the operation unit 107 does not receive the operation from the user if the user operates the operation unit 107.

In step S402, the microcomputer 106 controls the first communication unit 103 to acquire the first temperature information, the voltage information, the current information, and the remaining capacity information via the interface 101 from the battery pack 200.

If the first temperature information, the voltage information, the current information, and the remaining capacity information are acquired via the interface 101 from the battery pack 200, the microcomputer 106 stores the acquired first temperature information, voltage information, current information, and remaining capacity information in the memory 110. In this case, the flowchart proceeds from step S402 to step S403.

In step S402, the microcomputer 106 determines whether the temperature detection unit 104 acquires the second temperature information from the battery pack 200 via the interface 101. If the microcomputer 106 determines that the temperature detection unit 104 acquires the second temperature information, the microcomputer 106 stores the acquired second temperature information in the memory 110.

In step S403, the microcomputer 106 determines whether the power of the mobile phone 100 is turned ON.

The microcomputer 106 may determine whether the power of the mobile phone 100 is turned ON based on whether the power button of the operation unit 107 is operated to turn on the power of the mobile phone 100. Alternatively, the microcomputer 106 may determine whether the power of the mobile phone 100 is turned ON based on the power button of the operation unit 107 is operated to turn off the power of the mobile phone 100.

If the microcomputer 106 determines that the power of the mobile phone 100 is turned ON (YES in step S403), the flowchart proceeds from step S403 to step S404. If the microcomputer 106 determines that the power of the mobile phone 100 is not turned ON (NO in step S403), the flowchart returns from step S403 to step S401.

In step S404, the microcomputer 106 controls the power supply unit 105 to supply power supplied from the battery pack 200 to the power supply unit 105, to the mobile phone 100. In this case, the power supply unit 105 supplies a required voltage to the voltage detection unit 102, the first communication unit 103, the temperature detection unit 104, the microcomputer 106, the operation unit 107, the memory 110, and the ROM 111.

In this case, the power supply unit 105 can supply a required voltage to the recording medium 112, the second communication unit 118, the display unit 108, the voice processing unit 115, the microphone 116, the speaker 117, the image capturing unit 113, and the image processing unit 114.

If the power that is supplied from the battery pack 200 is supplied to the mobile phone 100, the power of the mobile phone 100 is turned ON. In this case, the flowchart proceeds from step S404 to step S405.

During the process in step S404, the microcomputer 106 periodically performs the process in step S402. Further, if the process in step S404 is executed, the microcomputer 106 controls the mobile phone 100 according to the operation of the user on the operation unit 107.

In step S404, the microcomputer 106 controls the power supply unit 105 to supply power that is supplied from the battery pack 200 thereto to the mobile phone 100. Alternatively, in step S404, the microcomputer 106 may control the power supply unit 105 to supply the power that is supplied from the battery pack 200 thereto to a part of the mobile phone 100 according to an operation mode of the mobile phone 100.

If the mobile phone 100 is in an image capturing mode, the microcomputer 106 may control the power supply unit 105 to supply required power to the display unit 108, the recording medium 112, the image processing unit 114, the image capturing unit 113, the voice processing unit 115, the microphone 116, and the speaker 117. In this case, the microcomputer 106 may control the power supply unit 105 not to supply the required power to the second communication unit 118.

Further, if the mobile phone 100 captures a still image, the microcomputer 106 may control the power supply unit 105 not to supply required power to the voice processing unit 115, the microphone 116, and the speaker 117. Further, if capturing a motion image, the microcomputer 106 may control the power supply unit 105 to supply required power to the voice processing unit 115, the microphone 116, and the speaker 117.

Further, if the mobile phone 100 is in a reproduction mode, the microcomputer 106 may control the power supply unit 105 to supply required power to the display unit 108, the recording medium 112, the image processing unit 114, the voice processing unit 115, and the speaker 117. In this case, the microcomputer 106 may control the power supply unit 105 not to supply required power to the image capturing unit 113 and the second communication unit 118.

Further, if the mobile phone 100 reproduces a still image, the microcomputer 106 may control the power supply unit 105 not to supply required power to the voice processing unit 115 and the speaker 117. Further, if reproducing a motion image, the microcomputer 106 may control the power supply unit 105 to supply required power to the voice processing unit 115 and the speaker 117.

Further, if the mobile phone 100 is in a voice communication mode, the microcomputer 106 may control the power supply unit 105 to supply required voltage to the display unit 108, the image processing unit 114, the voice processing unit 115, the speaker 117, the microphone 116, and the second communication unit 118. In this case, the microcomputer 106 may control the power supply unit 105 not to supply required power to the image capturing unit 113.

Further, if the mobile phone 100 is in an e-mail mode, the microcomputer 106 may control the power supply unit 105 to supply required power to the display unit 108, the image processing unit 114, and the second communication unit 118. In this case, the microcomputer 106 may control the power supply unit 105 not to supply required power to the image capturing unit 113.

Even if the operation mode of the mobile phone 100 is any of the modes, the microcomputer 106 controls the power supply unit 105 to supply required power to the voltage detection unit 102, the first communication unit 103, the temperature detection unit 104, the microcomputer 106, the operation unit 107, the ROM 111, and the memory 110.

If the power of the mobile phone 100 is turned ON (YES in step S403), when required power has already been supplied to the mobile phone 100, the microcomputer 106 may omit process in step S404.

If the mobile phone 100 is operated with the power supplied from the battery pack 200, the remaining capacity of the battery cell 201 charged in the battery pack 200 is reduced. With the reduction in remaining capacity of the battery pack 200, a voltage supplied to the electronic apparatus 100 by the battery pack 200 is reduced. Further, the battery pack 200 is not capable of supplying power for operating the mobile phone 100 thereto.

Therefore, the operation of the mobile phone 100 is stopped before the battery pack 200 cannot supply power. Then, the power of the mobile phone 100 is turned off.

Thus, when the power of the mobile phone 100 is turned ON, the mobile phone 100 needs to determine a state of power supplied from the battery pack 200 to the mobile phone 100.

As an example of a method for determining the state of power supplied from the battery pack 200 to the mobile phone 100, it is determined whether the voltage supplied from the battery pack 200 is higher than a specific voltage.

However, characteristics of internal resistance of the battery pack 200 can be dramatically changed depending on the temperature of the battery cell 201 in the battery pack 200.

If the temperature of the battery cell 201 is low, the internal resistance of the battery pack 200 rises. Therefore, the voltage of the battery cell 201 is sharply reduced. Thus, when the voltage of the battery cell 201 is reduced to be lower than the predetermined voltage V, the protection circuit 206 in the battery pack 200 is operated to disconnect the battery cell 201 from the electronic apparatus 100.

In this case, the battery pack 200 cannot supply the power to the mobile phone 100 via the interface 209. The power is not supplied from the battery pack 200 to the mobile phone 100. Therefore, the power of the mobile phone 100 is changed from ON to OFF before the microcomputer 106 normally stops the operation of the mobile phone 100.

Therefore, a method for determining whether the power is supplied to the mobile phone 100 from the battery pack 200 is selected according to the temperature of the battery cell 201. Thus, it is prevented that the power of the mobile phone 100 is turned OFF before the operation of the mobile phone 100 normally stops.

In step S405, the microcomputer 106 determines whether the temperature of the battery cell 201 is equal to or higher than a predetermined temperature D. In step S405, the microcomputer 106 acquires the temperature of the battery cell 201, which is compared with the predetermined temperature D, according to one of the first temperature information and the second temperature information stored in the memory 110.

The temperature of the battery cell 201 acquired according to one of the first temperature information and the second temperature information is referred to as a "temperature C of the battery cell 201". If the microcomputer 106 determines that the temperature C of the battery cell 201 is lower than the predetermined temperature D (NO in step S405), the microcomputer 106 determines that the temperature C of the battery cell 201 is low. In this case, the flowchart proceeds from step S405 to step S410.

If the microcomputer 106 determines that the temperature C of the battery cell 201 is the predetermined temperature D or higher (YES in step S405), the microcomputer 106 determines that the temperature C of the battery cell 201 is not low. In this case, the flowchart proceeds from step S405 to step S406.

The predetermined temperature D is a value stored in advance in the ROM 111. The predetermined temperature D may be acquired by the mobile phone 100 from the ROM 211 in the battery pack 200. The predetermined temperature D is, e.g., 10° C. or less.

If the temperature C of the battery cell 201 is equal to or higher than the predetermined temperature D (YES in step S405), the microcomputer 106 determines whether the voltage supplied from the battery pack 200 is higher than a specific voltage. Thus, the microcomputer 106 determines whether the power from the battery pack 200 is supplied to the mobile phone 100.

In step S406, the microcomputer 106 determines whether the detected voltage A is equal to or higher than a predetermined voltage E.

The predetermined voltage E is stored in advance on the ROM 111. Further, the predetermined voltage E is a threshold for controlling process for stopping the operation of the mobile phone 100 before changing the power of the mobile phone 100 from ON to OFF. Therefore, the microcomputer 106 sets the predetermined voltage E to be equal to or higher than a predetermined voltage for switching off the protection circuit 206. Further, the predetermined voltage E is equal to or higher than a predetermined voltage B.

The predetermined voltage E may be stored in advance on the ROM 111. Alternatively, the predetermined voltage E may be calculated by the microcomputer 205 of the battery pack 200, and may be acquired by the electronic apparatus 100 from the battery pack 200.

If the microcomputer 205 calculates the predetermined voltage E, the microcomputer 205 calculates the predetermined voltage E according to the predetermined voltage V, because as the predetermined voltage E is closer to the predetermined voltage V, the electronic apparatus 100 can efficiently use the power supplied from the battery cell 201.

If the microcomputer 106 determines that the detected voltage A is lower than the predetermined voltage E (NO in step S406), the flowchart proceeds from step S406 to step S407.

If the microcomputer 106 determines that the detected voltage A is equal to or greater than the predetermined voltage E (YES in step S406), the flowchart returns from step S406 to step S401.

If the temperature C of the battery cell 201 is equal to or higher than the predetermined temperature D (YES in step S405), the microcomputer 106 does not determine whether power is supplied to the mobile phone 100 from the battery pack 200 depending on the remaining capacity thereof. Therefore, if the remaining capacity of the battery pack 200 is 0, when the detected voltage A is equal to or higher than the predetermined voltage E, the microcomputer 106 does not stop the operation of the mobile phone 100. Therefore, the power is efficiently supplied from the battery pack 200.

In step S407, the microcomputer 106 controls the display unit 108 to display, on the display unit 108, information indicating that the remaining capacity of the battery pack 200 for operating the mobile phone 100 is not sufficient, and information for promoting the charge of the battery pack 200.

Further, the microcomputer 106 temporarily prohibits the operation of the operation unit 107 by the user from being received. At this time, the microcomputer 106 may control the display unit 108 to display information indicating that the power of the mobile phone 100 is changed from ON to OFF on the display unit 108.

In this case, the flowchart proceeds from step S407 to step S408. In step S407, the display on the display unit 108 can prompt the user to charge the battery pack 200 or replace the battery pack 200.

In step S408, the microcomputer 106 performs process for normally ending operations of the display unit 108, the voice processing unit 115, the microphone 116, the speaker 117, the second communication unit 118, the image capturing unit 113, and the image processing unit 114.

The microcomputer 106 confirms the end of the operations of the display unit 108, the voice processing unit 115, the microphone 116, the speaker 117, the second communication unit 118, the image capturing unit 113, and the image processing unit 114. Then, the flowchart proceeds from step S408 to step S409.

In step S409, the microcomputer 106 controls the power supply unit 105 not to supply the voltage from the battery pack 200 to the entire mobile phone 100.

In step S409, the microcomputer 106 further controls the backup power supply unit 109 to supply a required voltage to the voltage detection unit 102, the temperature detection unit 104, the microcomputer 106, the operation unit 107, and the ROM 111. In this case, the power of the mobile phone 100 is changed from ON to OFF. If the power of the mobile phone 100 is OFF, the flowchart ends.

If the temperature C of the battery cell 201 is lower than the predetermined temperature D (NO in step S405), the microcomputer 106 determines whether the remaining capacity of the battery pack 200 is equal to or less than a predetermined remaining capacity. Through this, the microcomputer 106 determines whether the power from the battery pack 200 is supplied to the mobile phone 100.

In step S410, the microcomputer 106 determines whether the remaining capacity of the battery pack 200 is equal to or less than a predetermined remaining capacity G.

The predetermined remaining capacity G is a value stored in advance on the ROM 111. Further, the predetermined remaining capacity G is a threshold for controlling process for stopping the operation of the mobile phone 100 before changing the power of the mobile phone 100 from ON to OFF. Therefore, the microcomputer 106 sets the predetermined remaining capacity G to supply power for performing process in steps S407, S408, and S409 to the mobile phone 100.

Further, the microcomputer 106 sets the predetermined remaining capacity G to perform the process in steps S407, S408, and S409 before the voltage of the battery cell 201 is lower than the predetermined voltage V.

The predetermined remaining capacity G may be stored in advance on the ROM 111. Further, the predetermined remaining capacity G may be calculated by the microcomputer 205 of the battery pack 200 and acquired by the electronic apparatus 100 from the battery pack 200.

When the microcomputer 205 calculates the predetermined remaining capacity G, the microcomputer 205 calculates the predetermined remaining capacity G according to the remaining capacity of the battery pack 200 when the voltage of the battery cell 201 is lower than the predetermined voltage V.

In step S410, the remaining capacity of the battery pack 200, which is compared with the predetermined remaining capacity G by the microcomputer 106, is the remaining capacity of the battery pack 200 corrected by the microcomputer 106 according to the temperature of the battery cell 201 and the data on the correction amount stored in the ROM 111.

A "remaining capacity F" is the remaining capacity of the battery pack 200 corrected according to the temperature of the battery cell 201 and the data corresponding to the correction amount stored in the ROM 111. The remaining capacity F according to the first exemplary embodiment indicates a value of a ratio of the remaining capacity to the total capacity of power charged in the battery pack 200. In this case, the predetermined remaining capacity G may be "0%" or more than "0%".

If the microcomputer 106 determines that the remaining capacity F of the battery pack 200 is equal to or less than the predetermined remaining capacity G (YES in step S410), the flowchart proceeds from step S410 to step S407.

If the microcomputer 106 determines that the remaining capacity F of the battery pack 200 is more than the predetermined remaining capacity G (NO in step S410), the flowchart returns from step S410 to step S401.

If the voltage of the battery cell 201 is reduced to be lower than the predetermined voltage V, the microcomputer 205 controls the protection circuit 206 to be turned OFF. Therefore, the microcomputer 106 performs process in steps S407, S408, and S409 according to the power supplied from the battery pack 200 to the mobile phone 100 during a period from a time when the remaining capacity of the battery pack 200 is equal to or less than the predetermined remaining capacity G to a time when the protection circuit 206 is turned OFF.

In step S408, the microcomputer 106 stops the operation of the mobile phone 100 to prevent error occurrence in the mobile phone 100. In step S409, the microcomputer 106 then can turn off the power of the mobile phone 100.

According to the first exemplary embodiment, the mobile phone 100 corrects the remaining capacity obtained from the remaining capacity information acquired from the battery pack 200 according to the temperature of the battery pack 200 and the data corresponding to the correction amount in FIG. 3 stored in the ROM 111.

However, the present invention is not limited to this. For example, the data corresponding to the correction amount in FIG. 3 is similarly stored in the ROM 211 of the battery pack 200. In this case, the microcomputer 205 can correct the remaining capacity acquired from the remaining capacity information detected by the remaining capacity detection unit 204 according to the first temperature information detected by the temperature detection unit 203 and the data corresponding to the correction amount recorded to the ROM 211.

In this case, the microcomputer 205 can transmit the remaining capacity information corrected by the battery pack 200, indicating the remaining capacity of the battery pack 200, to the electronic apparatus 100. When the remaining capacity of the battery pack 200 is corrected according to the temperature of the battery cell 201 in the battery pack 200, the electronic apparatus 100 may not correct the remaining capacity of the battery pack 200 according to the temperature of the battery pack 200.

According to the first exemplary embodiment, the remaining capacity F is the value indicating the ratio of the remaining capacity to the total capacity of the power charged in the battery pack 200. Alternatively, with a value other than this, the remaining capacity of the battery pack 200 may be indicated.

Further, the electronic apparatus 100 operated with the power supplied from the battery pack 200 is not limited to the mobile phone. In this case, the electronic apparatus 100 maybe a digital still camera, a digital video camera, or a music player.

In the power control system according to the first exemplary embodiment, the electronic apparatus 100 change the determination to perform process for stopping the operation of the electronic apparatus 100 by using the temperature of the battery cell 201 in the battery pack 200.

If the temperature of the battery cell 201 is equal to or higher than a predetermined temperature, the internal resistance of the battery pack 200 is not sharply increased. Further, the voltage of the battery cell 201 is not sharply reduced. Therefore, if the temperature of the battery cell 201 is equal to or higher than the predetermined temperature, the electronic apparatus 100 determines whether the process for stopping the operation of the electronic apparatus 100 is performed by using the voltage detected from the battery pack 200.

Thus, if it is determined that power is not supplied from the battery pack 200 to the electronic apparatus 100 based on the voltage detected from the battery pack 200, the operation of the entire electronic apparatus 100 also is normally stopped. Then, the power of the electronic apparatus 100 is turned off.

If the temperature of the battery cell 201 is lower than the predetermined value, the internal resistance of the battery pack 200 may be increased. Then, the voltage of the battery cell 201 can be sharply reduced. Therefore, if the temperature of the battery cell 201 is lower than the predetermined temperature, it is determined whether the process for stopping the operation of the electronic apparatus 100 by using the remaining capacity detected from the battery pack 200.

Thus, if it is determined that power is not supplied from the battery pack 200 to the electronic apparatus 100 based on the remaining capacity of the battery pack 200, the operation of the entire electronic apparatus 100 also normally is stopped. Then, the electronic apparatus 100 is turned off.

Therefore, the operation of the electronic apparatus 100 normally is stopped. Further, the electronic apparatus 100 is turned off. As a consequence, the power of the electronic apparatus 100 can be properly controlled.

The present invention is not limited to the electronic apparatus 100 according to the first exemplary embodiment. Further, the present invention is not limited to the battery pack 200 according to the first exemplary embodiment. According to the present invention, the electronic apparatus 100 and the battery pack 200 can be realized by a system including a plurality of devices.

Further, a computer program can realize the various process and functions according to the first exemplary embodiment. In this case, a computer including a central processing unit (CPU) can execute the computer program according to the present invention, thereby realizing the various functions according to the first exemplary embodiment.

Obviously, according to the present invention, the computer program may realize the various process and functions according to the first exemplary embodiment by using an operating system (OS) on the computer.

According to the present invention, the computer program is read from a computer-readable recording medium, and is executed by the computer. The computer-readable recording medium can be a hard disk device, an optical disk, a compact-disk read only memory (CD-ROM), a compact-disk recordable (CD-R), a memory card, or a read only memory (ROM). Further, the computer program according to the present invention may be provided for the computer from an external device via a communication interface, and may be executed by the computer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-286527 filed Dec. 22, 2010, which is hereby incorporated by reference herein in its entirety.

What is claimed is:

1. An electronic apparatus comprising:
    a voltage detection unit that detects a voltage of a battery device;
    an obtaining unit that obtains a remaining capacity of the battery device detected by the battery device from the battery device;
    a temperature detection unit that detects a temperature; and
    a control unit that (a) performs, according to whether a temperature detected by the temperature detection unit is higher than a predetermined temperature, one of a first process and a second process, and (b) performs the second process if a temperature detected by the temperature detection unit is not higher than the predetermined temperature, wherein the first process includes a process for checking a voltage detected by the voltage detection unit, wherein the first process is performed for controlling whether to perform a process for turning off the electronic apparatus, wherein the second process includes a process for checking a remaining capacity of the battery device obtained by the obtaining unit without checking a voltage detected by the voltage detection unit, and wherein the second process is performed for controlling whether to perform the process for turning off the electronic apparatus.

2. The electronic apparatus according to claim 1, wherein, if a temperature detected by the temperature detection unit is higher than the predetermined temperature, the control unit performs the first process.

3. The electronic apparatus according to claim 1, wherein the electronic apparatus includes at least one of a mobile phone, a digital still camera, a digital camera, and a music player.

4. A method for controlling an electronic apparatus comprising:
    detecting a voltage of a battery device;
    obtaining a remaining capacity of the battery device detected by the battery device from the battery device;
    detecting a temperature; and
    performing, according to whether a detected temperature is higher than a predetermined temperature, one of a first process and a second process, wherein the first process includes a process for checking a detected voltage, wherein the first process is performed for controlling whether to perform a process for turning off the electronic apparatus, wherein the second process includes a process for checking a remaining capacity of the battery device obtained from the battery device without checking a detected voltage, and wherein the second process is performed for controlling whether to perform the process for turning off the electronic apparatus; and
    performing the second process if a detected temperature is not higher than the predetermined temperature.

5. A non-transitory computer-readable recording medium that stores a computer-executable program for causing a computer to execute a method for controlling an electronic apparatus, the method comprising:
    detecting a voltage of a battery device;
    obtaining a remaining capacity of the battery device detected by the battery device from the battery device;
    detecting a temperature; and
    performing, according to whether a detected temperature is higher than a predetermined temperature, one of a first process and a second process, wherein the first process includes a process for checking a detected voltage, wherein the first process is performed for controlling whether to perform a process for turning off the electronic apparatus, wherein the second process includes a process for checking a remaining capacity of the battery device obtained from the battery device without checking a detected voltage, and wherein the second process is performed for controlling whether to perform the process for turning off the electronic apparatus; and
    performing the second process if a detected temperature is not higher than the predetermined temperature.

6. The electronic apparatus according to claim 1, wherein, if a temperature detected by the temperature detection unit is higher than the predetermined temperature and a voltage detected by the voltage detection unit is higher than a predetermined voltage, the control unit does not perform a process for turning off the electronic apparatus.

7. The electronic apparatus according to claim 1, wherein, if a temperature detected by the temperature detection unit is higher than the predetermined temperature and a voltage detected by the voltage detection unit is not higher than a predetermined voltage, the control unit performs a process for turning off the electronic apparatus.

8. The electronic apparatus according to claim 1, wherein, if a temperature detected by the temperature detection unit is not higher than the predetermined temperature and a remaining capacity obtained by the obtaining unit is more than a predetermined remaining capacity, the control unit does not perform a process for turning off the electronic apparatus.

9. The electronic apparatus according to claim 1, wherein, if a temperature detected by the temperature detection unit is not higher than the predetermined temperature and a remaining capacity obtained by the obtaining unit is not more than a predetermined remaining capacity, the control unit performs a process for turning off the electronic apparatus.

10. The method according to claim 4, further comprising performing the first process if a detected temperature is higher than the predetermined temperature.

11. The method according to claim 4, further comprising, if a detected temperature is higher than the predetermined temperature and a detected voltage is not higher than a predetermined voltage, performing a process for turning off the electronic apparatus.

12. The method according to claim 4, further comprising, if a detected temperature is not higher than the predetermined temperature and a remaining capacity obtained from the battery device is not more than a predetermined remaining capacity, performing a process for turning off the electronic apparatus.

\* \* \* \* \*